July 3, 1962   C. N. SPENCER ET AL   3,041,674
WHITE SIDEWALL TIRE
Filed April 23, 1956

INVENTORS
CORWIN N. SPENCER
WILLIAM H. MYERS
BY
W. A. Fraser
ATTY.

United States Patent Office 3,041,674
Patented July 3, 1962

3,041,674
WHITE SIDEWALL TIRE
Corwin Nathan Spencer, Akron, and William Henry Myers, Stow, Ohio, assignors to The Firestone Tire & Rubber Company, Akron, Ohio, a corporation of Ohio
Filed Apr. 23, 1956, Ser. No. 579,786
7 Claims. (Cl. 18—61)

This invention relates to multi-colored rubber articles and more particularly to a method and apparatus for accurately controlling the location of the line of juncture between different colored rubber members in a multi-colored composite rubber article.

This is a continuation-in-part of our copending application, Serial No. 289,544, now abandoned.

In the rubber manufacturing industry, much effort is directed to the production of composite rubbery articles wherein a light colored member forms a line of juncture with a dark colored rubbery member. One such article is a white sidewall tire wherein the line of juncture between the white side wall member and the adjoining black sidewall member must be symmetrical if a pleasing appearance is to be maintained. If, during tire vulcanization, the white sidewall portion flows up at its edge into that portion of the tire designed to be occupied by black sidewall material, or vice versa the symmetry of the line of juncture is lost. A like problem is present in the manufacture of many other multi-colored composite rubbery articles wherein the flow of a stock into an area occupied by a stock of different color is undesirable.

Heretofore, in the manufacture of a white sidewall tire, particularly in the case of a tire having a rubbery black rib adjoining the white stock, it has been proposed to form a flat rubbery black sidewall member with a heavy black rib on the lower edge thereof, said member being adhered to the fabric body of the tire during tire building, and a flat rubbery white sidewall member having a thin veneer edge portion being applied between said black rib and the bead of the tire with the veneer edge portion of the white sidewall member overlapping in part the black rib. After the tire was vulcanized the overlapping, white veneer edge was buffed off leaving the black rib entirely exposed. This method failed to provide a symmetrical line of juncture between the white and black stock because buffing into the black rib to remove the white veneer exposed portions of the white sidewall member underlying the rib. The white stock is found under the rib because during cure the white stock flows under pressure to displace the black stock of the rib to a greater or less degree unevenly around the entire circumference to the sidewall of the tire. The result is a deviation from a circular line of juncture which destroys the molded symmetry of the line of juncture of the lower edge of the black rib, and hence the pleasing appearance of the tire.

It is, therefore, an object of this invention to provide a method and apparatus for establishing a uniform line of the juncture between a dark colored member and a light colored member of a composite rubber article. It is also an object of this invention to provide a method and apparatus for establishing a uniform line at the juncture of the black and white stock on a white sidewall tire. A further object of this invention is to provide a method and apparatus for establishing a uniform line of juncture between the black and white stock of a white sidewall tire when such line of juncture is at the lower edge of the buffing rib. Yet another object of this invention is to provide a method and apparatus for establishing a uniform line of juncture of the black and white stock of white sidewall tires when such juncture is at the upper edge of the buffing rib.

These and other objects are obtained by vulcanizing the rubber article in a mold having a groove to provide for the formation of a lip of black stock covered by white stock at the desired line of juncture.

Figure 1:
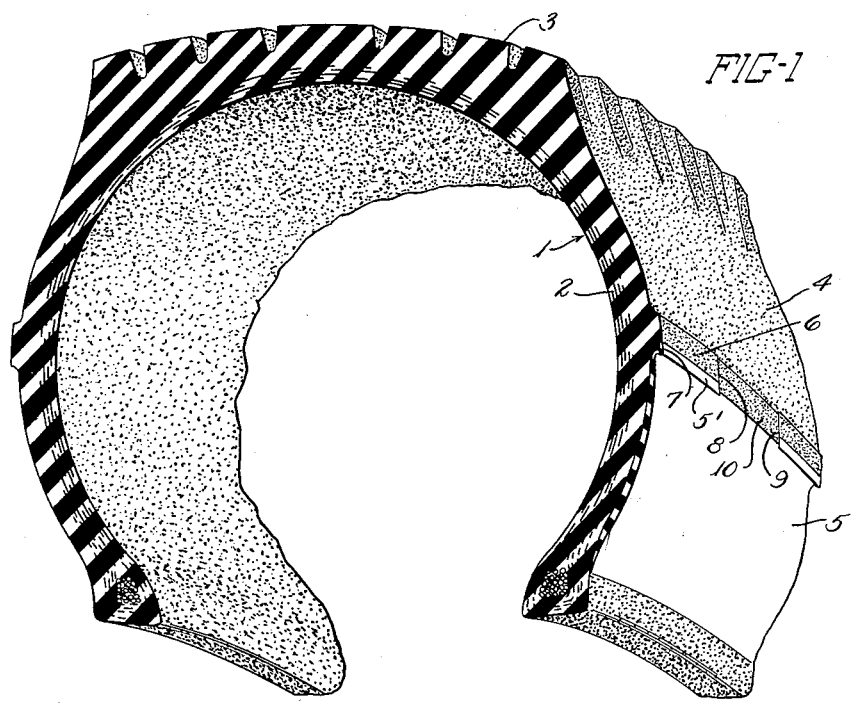
FIGURE 1 is a fragmentary sectional view in perspective of a black rib white sidewall tire formed by use of the present invention, with the rib shown so buffed in part, and unbuffed in part.

In reference to FIGURE 1, a tire generally indicated at 1, is composed of a rubber coated fabric body section 2, a tread portion 3, rubbery black sidewall portion 4 and rubbery white sidewall portion 5 framed by a black rib portion 6. The small lip 7 is formed by a complementary groove in the tire mold, and said lip is outwardly coated with white stock from the white sidewall 5. Because of the flow characteristic of the rubber in black rib 6 and in the white sidewall 5 during tire vulcanization, the white stock covers, in a thin veneer 5¹, part of the outer surface of the black rib. Only a light buffing operation is required to remove the white veneer down to the black stock in the lip 7 to expose the symmetrical line of juncture. The rib 6 in FIGURE 1 has been lightly buffed in the area from line 8 to line 9 to expose black rib stock, and define a uniform juncture line 10 between white sidewall 5 and black rib 6.

Figure 2:
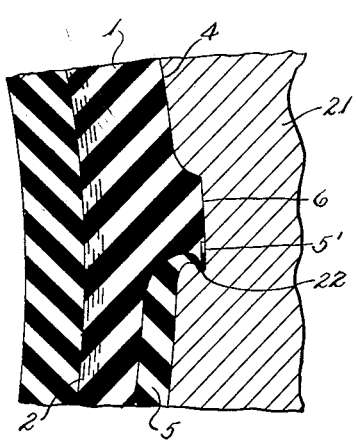
FIGURE 2 is a fragmentary sectional view of the sidewall of a black rib white sidewall tire in a tire vulcanizing mold illustrating one modification of the invention.
Figure 3:
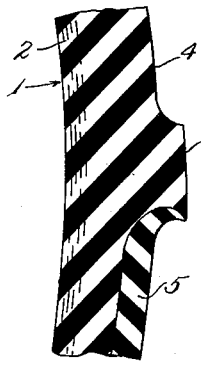
FIGURE 3 is a fragmentary sectional view of the rib of a finished black rib white sidewall tire after vulcanization in a mold embodying the invention.

The apparatus for molding the tire of FIGURE 1 is shown fragmentarily in FIGURE 2 wherein the polished metal surface of the mold 21 defines the contour of the rib portion 6 of the tire. Groove 22 is channeled in the mold 21 adjacent the edge of round lip 27 to define in part black rib 6 and it is into this groove 22 that the rubber from the white sidewall 5 and the black sidewall 4 flows during tire molding to form groove 23 terminating outwardly in lip 7 of FIGURE 1. Buffing of the rib portion after tire vulcanization with a light abrasive material or a fine wire brush will remove the white stock veneer 5¹ to reveal the underlying black stock and provide the finished sidewall having line of juncture 12 shown in FIGURE 3.

Part of the black stock is formed during molding into the very thin lip 7, surrounded by white stock 5¹; at the lower edge of the black rib 6. Removal of white stock from the black lip completely around the tire results in a symmetrical circumferential line of juncture between the black rib 6 and the white sidewall 5.

Figure 4:
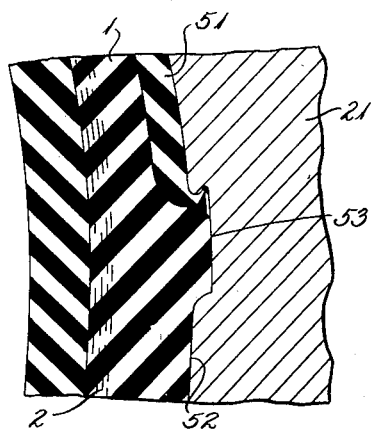
FIGURE 4 is a fragmentary sectional view of a white rib white sidewall tire with the apparatus of the invention.

When it is desired that the rib 6 of the white sidewall tire be white, the groove of the invention is placed adjacent the upper edge of the rib contour defining mold as shown in FIGURE 4 and is so positioned that the black sidewall stock 51 will flow therein pinching the white stock 52 to a thin lip at the edge of groove 54. When the tire is removed from the mold and the black veneer 55 is buffed from the rib 53 to reveal the white tip, a symmetrical line of demarcation results.

In the operation of the invention, a white sidewall tire is built up on a tire building drum in a conventional manner to provide a heavy rib black portion positioned adjoining a thin flat white portion which has a thin veneer overlapping in part the black rib. The tire is removed from the tire building drum, bagged and shaped in a manner familiar to those skilled in the art of tire manufacture. The tire is next positioned in a mold with the veneer-covered black rib against the groove of the present invention and pressure applied internal the tire. This pressure forces the black rib portion of the unvulcanized tire into the adjacent rib contoured portion of the mold so that the black stock covered by white veneer flows into the groove and is pinched to a thin, tapered, circular flange. After vulcanization is completed, the tire is removed from the mold and placed on a table where the thin veneer of white stock is buffed off to expose the underlying body of black stock at the edge of the rib. The result is a uniform marginal line between the white and black of the sidewall providing the requisite pleasing appearance.

The symmetrical line is obtained because of the flow of stock into the groove of the mold. Since the white veneer 5' is of even gage all the way around the tire, it will fill only a certain portion of the groove, the balance of the groove being filled by black stock from the rib 6. Black stock from the rib 6 follows the white stock into the groove uniformly all the way around the groove and when the thin veneer of white 5' is buffed off the tire after vulcanization, a uniform annular edge of black stock is exposed.

Although several examples have been shown, those skilled in the art will recognize the usefulness of other modifications. The invention is not to be limited to the examples shown but only the knowledge of the art in view of the attached claims.

We claim:

1. In the manufacture of a pneumatic white sidewall tire characterized by a rubbery white sidewall member having a circumferential axially protruding black rib edge portion marginally framing and meeting at a line of juncture a rubbery white sidewall member, a method of making said line of juncture between said white member and said rib symmetrical, comprising the steps of construction and unvulcanized tire band with an unvulcanized rubbery white sidewall member having a veneer edge overlapping in part an unvulcanized rubbery black rib, molding a radially extending annular lip on said veneer-covered rib at the desired point of juncture of said black member with said white member as the tire is vulcanized, to thereby reduce the thickness of said veneer to a very thin layer at the extreme edge of said lip and buffing said rib on its generally annular outer surface flush with the axial inner margin of the base of said lip to expose black stock in the rib and a symmetrical line of juncture between said white member and said black member.

2. In the manufacture of a pneumatic light colored sidewall tire characterized by a rubbery light colored sidewall member having a circumferential axially protruding black rib edge portion marginally framing and meeting at a line of juncture a rubbery light colored sidewall member, a method of making said line of juncture between said light colored member and said rib symmetrical, comprising the steps of constructing an unvulcanized tire band with an unvulcanized rubbery light colored sidewall member having a veneer edge overlapping in part an unvulcanized rubbery black rib, molding a radially extending annular lip on said veneer-covered rib at the desired point of juncture of said black member with said light colored member as the tire is vulcanized to thereby reduce the thickness of said veneer to a very thin layer at the extreme edge of said lip and buffing said rib on its generally annular outer surface flush with the axial inner margin of the base of said lip to expose black stock in the rib and a symmetrical line of juncture between said light colored member and said black member.

3. In the manufacture of a pneumatic white sidewall tire characterized by a rubbery white sidewall member having a white rib marginally framing and meeting at a line of juncture a rubbery black sidewall member, a method of making said line of juncture between said black member and said white rib symmetrical, comprising the steps of constructing an unvulcanized tire band with an unvulcanized black sidewall member having a veneer edge overlapping in part the unvulcanized rubbery white sidewall rib, molding a radially extending annular lip on the edge of said rib adjacent said black member as the tire is vulcanized to thereby reduce the thickness of said veneer to a very thin layer at the extreme edge of said lip and buffing said rib to remove said veneer and said lip to expose white stock in the rib and thereby a symmetrical line of juncture between said white member and said black member.

4. In the manufacture of a pneumatic white sidewall tire characterized by a radially inner rubbery white sidewall member having a white rib marginally framing and meeting at a line of juncture a radially outer rubbery black sidewall member, a method of making said line of juncture between said black member and said white rib symmetrical comprising the steps of constructing an unvulcanized tire band with a radially outer unvulcanized black sidewall member having a veneer edge overlapping in part the radially inner unvulcanized rubbery white sidewall rib, molding a radially extending annular lip on the radially outer edge of said rib adjacent said black member as the tire is vulcanized to thereby reduce the thickness of said veneer to a very thin layer at the extreme edge of said lip and buffing said rib to remove said veneer and said lip to expose white stock in the rib and thereby a symmetrical line of juncture between said white member and said black member.

5. In the manufacture of a pneumatic white sidewall tire characterized by a radially inner rubbery white sidewall member having a radially outer circumferential axially protruding black rib edge portion marginally framing and meeting at a line of juncture a rubbery white sidewall member, a method of making said line of juncture between said white member and said rib symmetrical, comprising the steps of constructing an unvulcanized tire band with a radially inner unvulcanized rubbery white sidewall member having a veneer edge overlapping in part a radially outer unvulcanized rubbery black rib molding a radially extending annular lip on said veneer-covered rib at the desired point of juncture of said black member with said white member as the tire is vulcanized to thereby reduce the thickness of said veneer to a very thin layer at the extreme edge of said lip and buffing said rib on its annular outer surface flush with the axial inner margin of the base of said lip to expose black stock in the rib and a symmetrical line of juncture between said white member and said black member.

6. In the manufacture of a pneumatic white sidewall tire characterized by a rubbery white sidewall member having an axially protruding white rib marginally framing and meeting at a line of juncture a rubbery black sidewall member, a method of making said line of juncture between said black member and said white rib symmetrical comprising the steps of constructing an unvulcanized tire band with an unvulcanized black sidewall member having a veneer edge overlapping in part the unvulcanized rubbery white sidewall rib molding a radially extending annular lip on the edge of said rib adjacent said black member as the tire is vulcanized to thereby reduce the thickness of said veneer to a very thin layer at the extreme edge of said lip and buffing said rib to remove said veneer to a depth flush with the axial inner margin of the base of said lip to expose white stock in the rib and thereby a symmetrical line of juncture between said white member and said black member.

7. In the manufacture of a pneumatic light colored sidewall tire characterized by a rubbery light colored sidewall member having a circumferential axially protruding black rib edge portion marginally framing and meeting at a line of juncture a rubbery light colored sidewall member, a method of making said line of juncture between said light colored member and said rib symmetrical, comprising the steps of constructing an unvulcanized tire band with an unvulcanized rubbery light colored sidewall member having a veneer edge overlapping in part an unvulcanized rubbery black rib, molding a radially extending annular lip on said veneer covered rib at the desired point of juncture of said black member with said light colored member as the tire is vulcanized, to thereby reduce the thickness of said veneer to a very thin layer at the extreme edge of said lip and buffing said rib on its generally annular outer surface to a depth sufficient to remove part of said lip and to expose black stock in the rib whereby a symmetrical line of juncture is formed between said light colored member and said black member.

References Cited in the file of this patent

UNITED STATES PATENTS

| | | |
|---|---|---|
| 1,448,286 | Comstock | Mar. 13, 1923 |
| 1,940,077 | Coe | Dec. 19, 1933 |
| 2,240,855 | Phillips | May 6, 1941 |
| 2,240,856 | Phillips | May 6, 1941 |
| 2,476,884 | Maynard | July 19, 1949 |
| 2,497,226 | McNeill | Feb. 14, 1950 |
| 2,612,461 | Hallgren | Sept. 30, 1952 |
| 2,679,277 | Gray | May 25, 1954 |
| 2,679,663 | Schwemler et al. | June 1, 1954 |
| 2,726,925 | Saulino | Dec. 13, 1955 |
| 2,761,489 | Kraft | Sept. 4, 1956 |

UNITED STATES PATENT OFFICE
CERTIFICATE OF CORRECTION

Patent No. 3,041,674                        July 3, 1962

Corwin Nathan Spencer et al.

It is hereby certified that error appears in the above numbered patent requiring correction and that the said Letters Patent should read as corrected below.

Column 3, line 37, for "construction" read -- constructing --; line 38, for "and" read -- an --.

Signed and sealed this 4th day of December 1962.

(SEAL)
Attest:

ERNEST W. SWIDER
Attesting Officer

DAVID L. LADD
Commissioner of Patents